United States Patent [19]

Thauer

[11] 4,182,288
[45] Jan. 8, 1980

[54] MIXTURE-COMPRESSING, SPARK-IGNITED INTERNAL COMBUSTION ENGINE HAVING A COMBINED THROTTLE AND COMPRESSION CONTROL

[75] Inventor: Peter Thauer, Wolfsburg, Fed. Rep. of Germany

[73] Assignee: Volkswagenwerk Aktiengesellschaft, Wolfsburg, Fed. Rep. of Germany

[21] Appl. No.: 876,544

[22] Filed: Feb. 9, 1978

[30] Foreign Application Priority Data

Feb. 9, 1977 [DE] Fed. Rep. of Germany ....... 2705339

[51] Int. Cl.² .............................................. F02B 75/04
[52] U.S. Cl. ............................. 123/78 AA; 123/48 A; 123/48 D; 123/78 R; 123/78 D
[58] Field of Search ................ 123/48 R, 48 A, 48 D, 123/48 AA, 51 AA, 53 AA, 78 R, 78 A, 78 AA, 78 D, 78 F

[56] References Cited

U.S. PATENT DOCUMENTS

| 1,914,707 | 6/1933 | Wolf | 123/78 A |
|---|---|---|---|
| 2,106,099 | 1/1938 | Jenkins | 123/78 A |
| 2,369,738 | 2/1945 | Johnson | 123/78 A |
| 2,382,362 | 8/1945 | Weinreb | 123/78 A |
| 2,666,421 | 1/1954 | Ring | 123/78 AA |
| 3,254,636 | 6/1966 | Faust | 123/78 A |
| 3,741,175 | 6/1973 | Rouger | 123/78 A |
| 3,961,607 | 6/1976 | Brems | 123/78 D |

*Primary Examiner*—Charles J. Myhre
*Assistant Examiner*—David D. Reynolds
*Attorney, Agent, or Firm*—Brumbaugh, Graves, Donohue & Raymond

[57] ABSTRACT

A mixture-compressing, spark-ignited internal combustion engine has a combined throttle and compression control. The engine has at least one main piston sliding in a main cylinder and driving a crankshaft, and an auxiliary piston sliding in an auxiliary cylinder, which auxiliary piston is driven at half the frequency of the crankshaft by a drive shaft activated by a drive means coupled to the crankshaft. The compression chamber formed by the auxiliary piston is connected with the compression chamber formed by the main piston, and a control device is provided for modification of the phase piston of the auxiliary piston relative to the main piston so as to achieve a compression chamber volume at compression top dead center of the main piston which is variable as a function of the operating parameters of the internal combustion engine.

8 Claims, 7 Drawing Figures

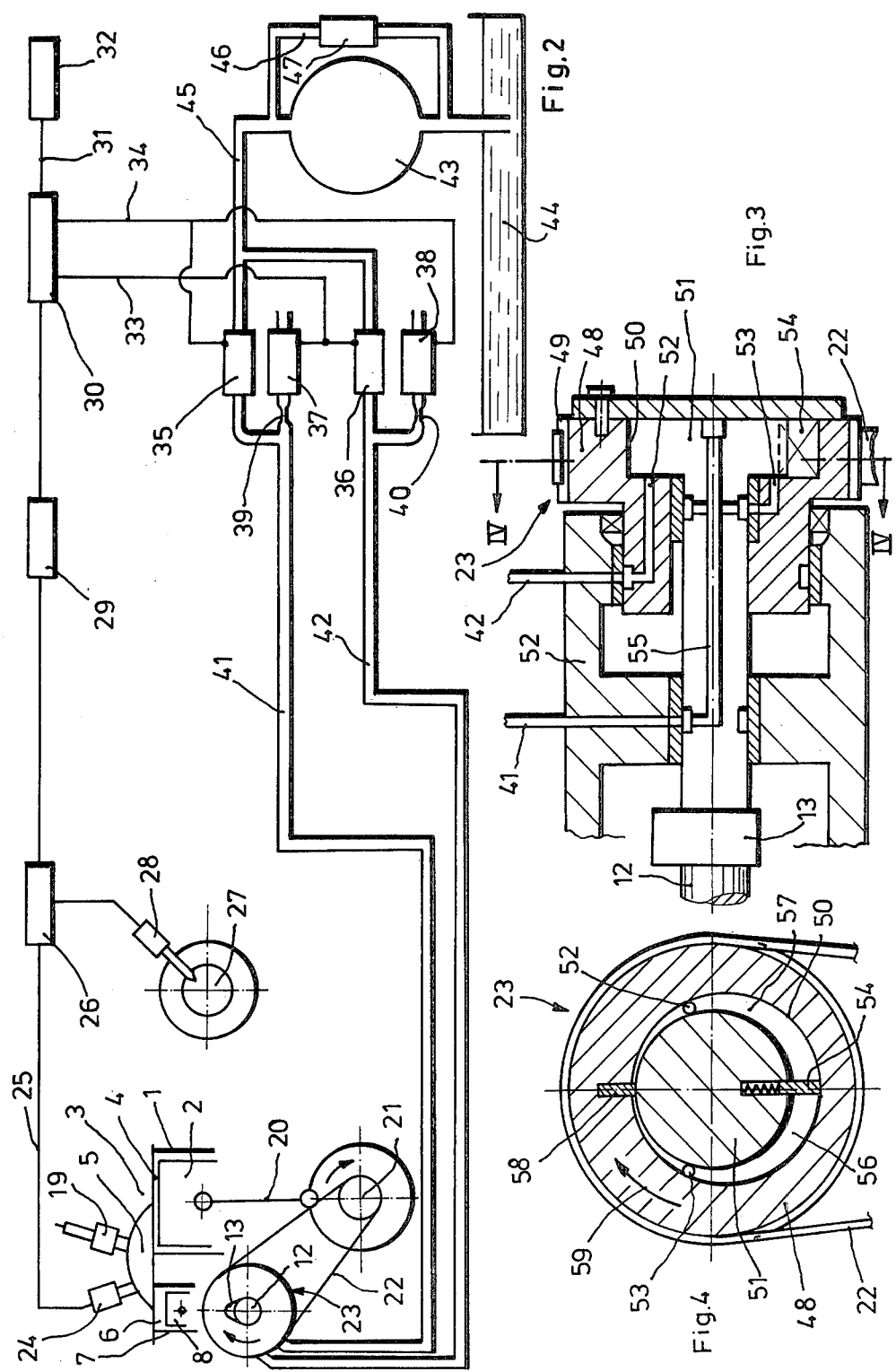

MIXTURE-COMPRESSING, SPARK-IGNITED INTERNAL COMBUSTION ENGINE HAVING A COMBINED THROTTLE AND COMPRESSION CONTROL

BACKGROUND OF THE INVENTION

Mixture-compressing, spark-ignited reciprocating-piston internal combustion engines are customarily operated by means of a throttle control. As opposed to the full load state, in the partial-load range of the engine the amount of intake fuel and air will be greatly reduced, although the fuel-air ratio remains approximately the same. For any given engine speed (RPM) this results in a decreased final compression pressure as the throttling increases (i.e., as the load decreases) so that in accordance with the known thermodynamic relationships, the thermal efficiency at part load drops considerably in comparison with full load, resulting in an increase of the specific consumption of fuel in the engine.

A method is known for substantially improving the thermal efficiency at part load wherein the geometric compression ratio is adjusted such that the effective compression ratio, and thus the final compression pressure, is maintained approximately constant. The effective compression ratio can be defined according to the following relationship:

$$C_{eff} = \frac{V_S + V_C}{V_C}$$

where $V_S$ is the volume of fuel-air mixture taken into the cylinder during the induction stroke and $V_C$ is the compression chamber volume at the end of the compression stroke (at compression top dead center). An internal combustion engine having both throttle and compression control may be operated to achieve a fuel efficiency even better than that of diesel engines, and at the same time result in reduced emission pollutants.

An internal combustion engine having combined throttle and compression control is described in U.S. Pat. No. 3,961,607 in which each main piston is associated with an auxiliary piston sliding in an auxiliary cylinder, the auxiliary piston being actuable by a secondary crankshaft driven by the main crankshaft. The compression chambers of the main and the auxiliary pistons are in communication at all times, and by control of the phase position the total compression volume, consisting of the sum of the volumes of the main and auxiliary piston chambers when the main piston is at compression top dead center, can be varied as a function of the operating parameters of the engine.

In the engine disclosed in the U.S. Pat. No. 3,961,607, improved performance is achieved by driving the auxiliary piston at a higher stroke frequency than that of the main piston, so that the auxiliary piston performs several complete strokes during a single stroke of the main piston. This must necessarily lead to very high piston speeds of the auxiliary piston, resulting in considerably increased wear and tear and, in the case of an intermediate transmission such as the planetary transmission proposed in aforementioned patent, in considerable additional noise.

SUMMARY OF THE INVENTION

The present invention is a mixture-compressing, spark-ignited internal combustion engine with combined throttle and compression control which does not suffer from these shortcomings.

More particularly, an internal combustion engine according to the present invention has at least one main piston sliding in a main cylinder and driving a crankshaft, and an auxiliary piston sliding in an auxiliary cylinder, wherein the auxiliary piston is actuated by a drive means coupled between the crankshaft and a drive shaft driving the auxiliary piston, and the compression chamber of the auxiliary piston is connected with the compression chamber of the main piston. Furthermore, the drive shaft for the auxiliary piston is driven with half the frequency of the crankshaft, and a control device is provided in the form of a controllable fluid coupling arranged between the crankshaft and the drive shaft for modification of the phase of the auxiliary piston relative to the main piston so as to achieve a compression chamber volume at compression top dead center of the main piston which is variable as a function of the operating parameters of the engine. Due to the fact that the drive shaft for the auxiliary piston is driven with only half the frequency of the crankshaft, the demands on the auxiliary piston due to wear and tear and with regard to its life are even smaller than those made on the main piston. Through the use of a controllable fluid coupling as an intermediate drive for driving of the drive shaft by the crankshaft, a substantial decrease in noises is achieved in comparison with the known embodiment described above. The size and length of stroke of the auxiliary piston will be determined such that a constant effective compression ratio may be attained in the total compression space above the main and the auxiliary piston over the range of operating load conditions. Preferably, at ¼ load, the auxiliary piston is to reach its top dead center at approximately the same time the main piston reaches the end, that is, top dead center, of its compression stroke. If the internal combustion engine operates at full load, i.e., at approximately 100% charge, the auxiliary piston will be about to arrive at its lower dead center when the main piston has attained compression top dead center. At that time, the effective compression ratio should be approximately the same as for 25% partial load. In addition, since the auxiliary piston oscillates at half the frequency of the main piston, it acts to regulate the amount of fuel charge drawn into the cylinder. In the full load state, an additional mixture quantity is taken in by the auxiliary piston, whereas, at the partial load state, at which state the main and auxiliary pistons at the end of the compression stroke attain top dead center at the same time, the auxiliary piston retains in the exhaust stroke an exhaust gas volume. This will act similar to an interior exhaust gas return whereby, as is well known, the share of nitrous oxides can be effectively reduced.

In accordance with a further refinement of the invention, the fluid coupling is designed in the manner of a hydraulic vane-type servomotor with a drive hub driven by the crankshaft by way of a toothed belt. The drive hub has an eccentric cylindrical aperture in which is disposed a rotor connected with the drive shaft, the rotor, smaller in diameter, thereby forming a sickle-shaped working space. A radially movable, vane-like slide on the rotor subdivides the sickle-shaped working space into two part chambers, each provided with a hydraulic fluid connection. The rotor is arranged such that it is rotatable by 180° relative to the drive hub. Rotation of the drive hub is controlled by inlet and outlet valves in the hydraulic fluid lines for selectively connecting the two chambers with a hydraulic pump and a hydraulic fluid outlet, respectively.

It is advantageous that the control of the intake and outlet valves is obtained as a function of signals of a pressure signal indicator measuring the final compression pressure (top dead center of the main piston) in the combined compression chamber of the two pistons. In this manner, the control of the compression ratio is obtained as a function of the final compression pressure attained in the compression chamber. The pressure indicator signal is fed into a signal gate which is actuated by the ignition distributor in time with the ignition, such that the final compression pressure in the compression zone is measured. The final compression pressure signal, in turn, is compared with a desired value generated by a reference value generator by means of a desired value-actual value comparator which delivers an output signal controlling the hydraulic intake and outlet valves. In order to facilitate a slight modification of the final compression pressure, possibly as a function of the prevailing operating state of the internal combustion engine, a reference value generator may be provided which generates a signal variable with such conditions.

The drive shaft drives the auxiliary piston either through a crank drive or a cam drive, the latter possibly to be designed in such a manner that certain disadvantages deriving from the kinematics of the crank drive may be avoided. If a cam drive is used for driving the auxiliary piston, the auxiliary piston is pivotally attached to a connecting rod, which in turn is pivotally attached to a pivoting drag lever held by a spring in contact with the cam. In addition, a setting screw may be provided acting on the drag lever for adjusting the lower dead center position of the auxiliary piston stroke.

Further advantages and essential characteristics of the invention are contained in the following description which explains in further detail the example of an embodiment of the invention represented in the drawings, in which:

FIG. 1 is a longitudinal section through a cylinder arrangement of an internal combustion engine in accordance with the invention, comprising a main and an auxiliary cylinder;

FIG. 2 schematically shows the means for controlling the phase position of the auxiliary piston relative to the main piston;

FIG. 3 shows a longitudinal section through the controllable fluid coupling;

FIG. 4 shows a cross section through the fluid coupling in accordance with the sectional lines IV—IV of FIG. 3;

Figure 1:
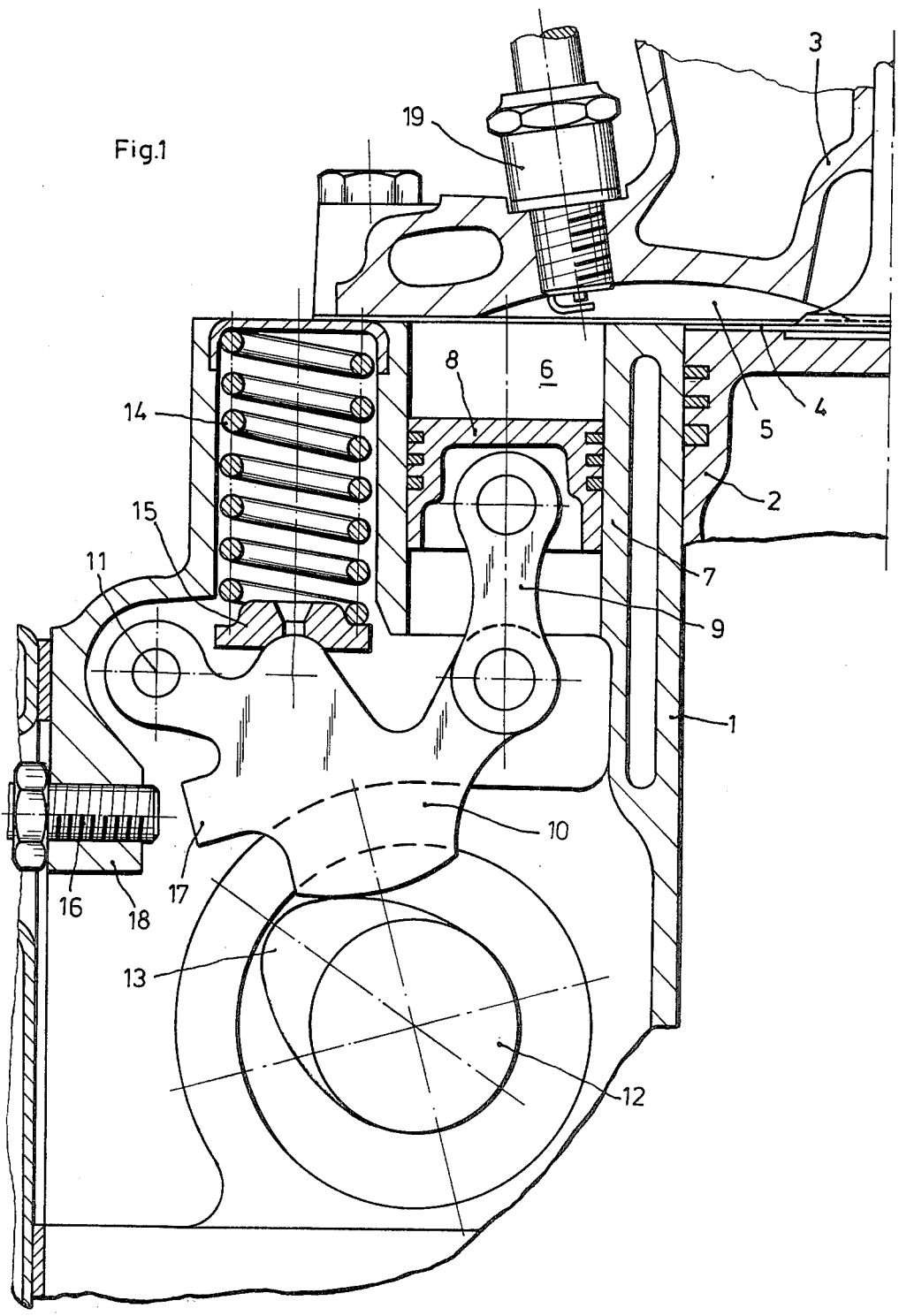

Referring to FIG. 1, an internal combustion engine is provided with several main cylinders 1 (one shown), in each of which slides a main piston 2. Between the main piston 2 and the cylinder head 3, which in the customary manner is provided with intake and outlet ports controlled by valves, is enclosed a main compression chamber 4 which has its smallest volume in the position of the main piston 2 shown in FIG. 1, i.e., compression top dead center. The compression chamber 4 associated with the main piston 2 is connected by way of a connecting passage 5 with an auxiliary compression chamber 6 associated with auxiliary piston 8 sliding in an auxiliary cylinder 7. A spark plug 19 projects into the chamber composed of the two compression chambers 4 and 6 for igniting the mixture.

A connecting rod 9 is pivotally attached to one end of the auxiliary piston 6, and at its other end is hinged to a drag lever 10 pivoting around a spindle 11 and actuable by a cam 13 attached to a drive shaft 12. The drag lever 10 is acted on by a spring disc 15 biased in a downward direction by a spring 14 whereby the contact of the drag lever 10 with the cam 13 is maintained. A setting screw 16 serves to adjust the clearance between the drag lever 10 and the cam 13 in the zone of its base circle, i.e., when the auxiliary piston is in its lower dead center position. The setting screw 16 can be adjusted relative to a housing part 18 and acts on a nose portion 17 of the drag lever 10. In place of the cam drive a crank drive coupled with the drive shaft 12 may be provided to drive the auxiliary piston 8, as shown schematically in FIG. 7. In that Figure the drive shaft 12a comprises a crankshaft driving the auxiliary piston 8 by means of a connecting rod 13a.

Figure 7:
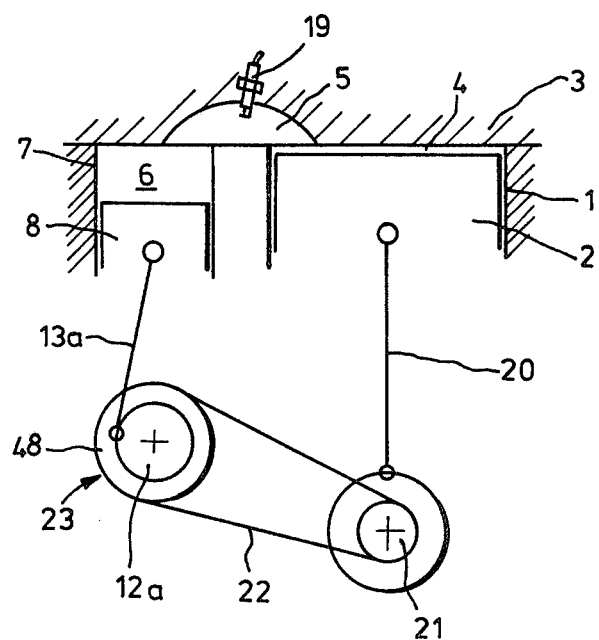
FIG. 7 schematically shows a crank drive mechanism for driving the auxiliary piston.

As indicated in FIGS. 2 and 7, the drive shaft 12 is driven by the crankshaft 21, e.g., by means of a toothed belt 22, a control device 23 being inserted into the driving connection. The driving of the crankshaft 21 is achieved in the customary manner by means of connecting rod 20 through the main piston or pistons, 2.

As mentioned above, a hydraulic controllable coupling is provided to control the phase shift between the auxiliary piston 8 and the main piston 2. The coupling is shown in FIGS. 3 and 4 and will be explained in detail later on. This controllable coupling receives control signals indicating the load condition of the internal combustion engine, responsive to which the phase of the auxiliary piston is either advanced or retarded. In order to provide this signal, the cylinder head 3 of the internal combustion engine contains a pressure signal generator 24 which continuously forwards a signal of the cylinder pressure over a line 25 to a signal gate. The signal gate 26 is also connected with a contactor 28 of the ignition distributor 27. As a result, the signal gate 26 is enabled to deliver a pressure signal at a given time, which signal is a function of the pressure prevailing at the end of the compression stroke (i.e., top dead center of the main piston) in the combined compression chambers 4, 5 and 6 of the internal combustion engine. Signals received at other times, however, are not forwarded.

The signal gate 26 feeds an averaging circuit 29 which in case of strong fluctuations of the compression end pressure signal value delivers as output an average value of several actual pressure value signals received, to a desired value-actual value comparator 30. The actual value of the final compression pressure is then compared with a desired value, provided by a reference value generator 32 over a signal line 31, and output control signals corresponding to the difference of these values is emitted which is forwarded either over signal line 33 or signal line 34. The reference value generator 30 may also be adapted to modify the reference signal as a function of the load condition of the internal combustion engine in order to attain a knock-proof partial-load operation. Through such a modification of the prescribed desired pressure value it also becomes possible to adjust the engine easily to various fuel quantities. Whereas the pressure signal generator 24 is a usual measuring instrument in the measuring technique, the signal gate 26, the averaging circuit 29, the desired value-actual value comparator 30 and the reference value generator 32 are known electronic assemblies from the analog computer technique, which can be represented by integrated circuits.

The signals generated by the desired value-actual value comparator 30 control the valves 35 to 38 arranged in hydraulic fluid lines 41 and 42 leading to the hydraulic fluid coupling 23. Each hydraulic line, 41 and 42, respectively, has an intake valve 35 and 36, and discharge valves, 37 and 38, respectively. A line 45 connects the pressure side of a pump 43, which delivers hydraulic fluid from an oil pan 44, with each of the intake valves 35 and 36, and the discharge valves 37 and 38 connect the hydraulic lines 41 and 42, through throttle points 39 and 40, with the atmosphere, i.e., with the oil pan 44. The throttle points 39 and 40 arranged in the pressure medium delivery lines 41 and 42 are provided to prevent a sudden pressure drop in one chamber of the fluid coupling when the outlet valve associated with the fluid line feeding that chamber is opened. This will prevent disturbances in the transmission of the variable torque to the coupling. At the same time, the throttle points 39 and 40 allow a sufficient rate of flow such that angular adjustment of the coupling, which is described more fully below, is not excessively delayed. The pump 43, driven electrically, for example, is constantly in operation and its output pressure is determined by spring-loaded control valve 47 arranged in a return line 46.

The signal lines 33 and 34 originating with the desired value-actual value comparator 30 are connected in such a manner that the intake valve of one and outlet valve of the other one of the two hydraulic lines 41 and 42 are actuated (open) simultaneously. For example, the signal line 33 actuates the inlet valve 36 in the pressure medium line 42 and the outlet valve 37 in the pressure medium line 41 when the actual value of the final compression pressure is larger than the desired value. Conversely, the inlet valve 35 of the hydraulic line 41 and the outlet valve 38 of the hydraulic fluid delivery line 42 will be actuated when the actual value of the final compression pressure is smaller than the desired value.

The position of the drive shaft 12 and cam is thus adjusted through the control of hydraulic fluid delivery to the fluid coupling, which is designed as a vane servomotor and is inserted in the driving connection between the crankshaft 21 and the drive shaft 12. The fluid coupling 23 consists of a driving hub 48 driven by the crankshaft 21 by means of the toothed belt 22, said hub being provided with a toothed outer contour 49 and an eccentric cylinder aperture 50. A plate-shaped rotor 51 is disposed within the eccentric clearance 50, the rotor 51 having a diameter smaller than the aperture. The rotor 51 is formed in one piece with the drive shaft 12, and has a radially moving, spring-loaded slide 54 dividing the sickle-shaped working space remaining between the plate-shaped rotor 51 and the inner contour of the drive hub aperture 50 into two chambers 56 and 57, which at their narrowest points may be sealed relative to each other by a radial seal 58. Each chamber, 56 and 57, has a hydraulic fluid connection 53 and 52, respectively, which are connected with the hydraulic fluid lines 41 and 42, the former by way of a center bore 55 arranged in the rotating drive shaft 12, as shown in FIG. 3.

Control of the fluid coupling is obtained by the corresponding compression action on the chambers 56 and 57 which results in a turning relative to the drive hub 48 of the plate-like rotor 51 provided with the slide 54. For example, if the pressure medium delivery line 41 is connected through the inlet valve 35 to the delivery side of the pump 43, the working chamber 56 is supplied in a controlled manner with hydraulic fluid, and at the same time hydraulic fluid is discharged out of the working chamber 57 by simultaneous opening of the outlet valve 38. As a result, the plate-shaped rotor 51 is moved counterclockwise from the center position shown in FIG. 4 relative to the drive hub 48. Where the rotation of the hub 48 is clockwise as indicated by the arrow 59 in FIG. 4, this will result in a retardation of the auxiliary piston relative to the main piston. The range of rotation between the plate-like rotor 51 and the driving hub 48 is to be approximately 180° relative to the angle of rotation of the drive shaft. Clearance losses in the fluid coupling do not exert any adverse influence on the operation of the control device in that such losses are automatically compensated due to the adjustment obtained in accordance with the invention of the drive shaft and the auxiliary piston to the prescribed value of the final compression pressure.

Figure 5:
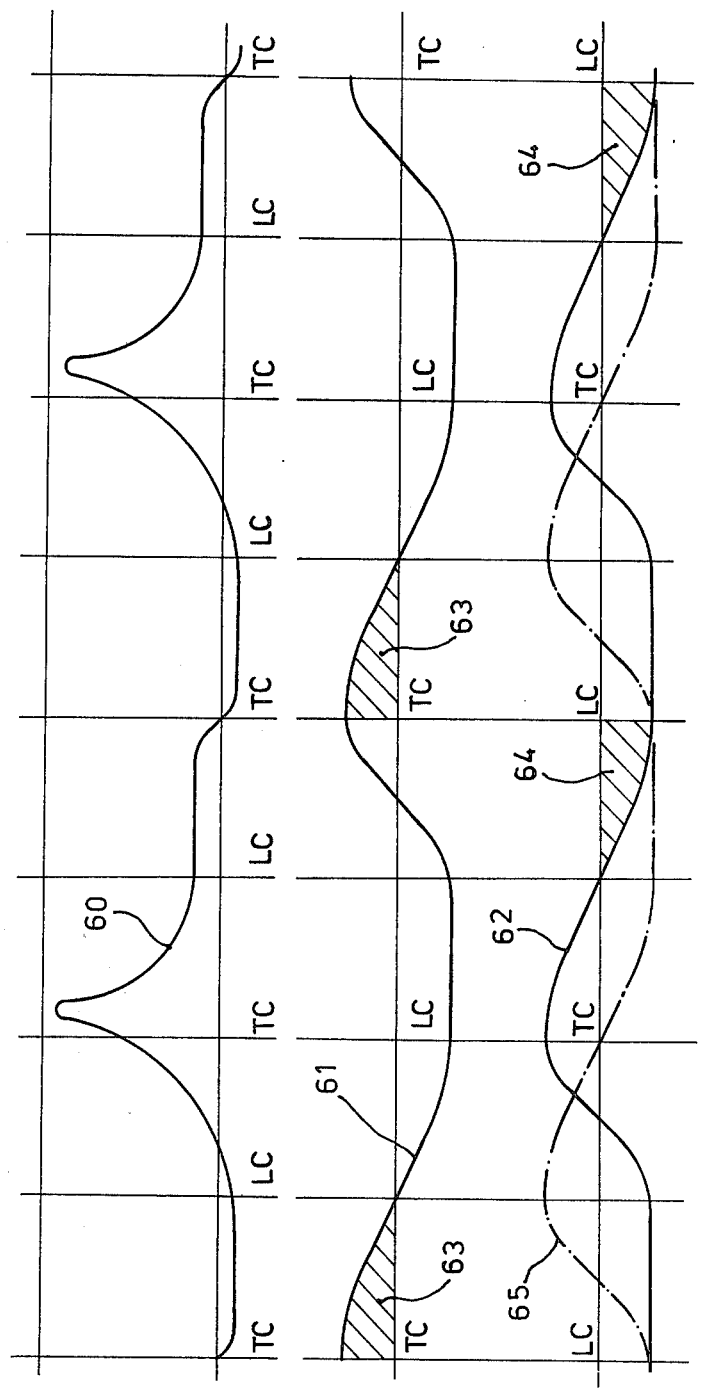
FIGS. 5 and 6 are graphs indicating the strokes of the main and auxiliary pistons, in each case plotted over time.
Figure 6:
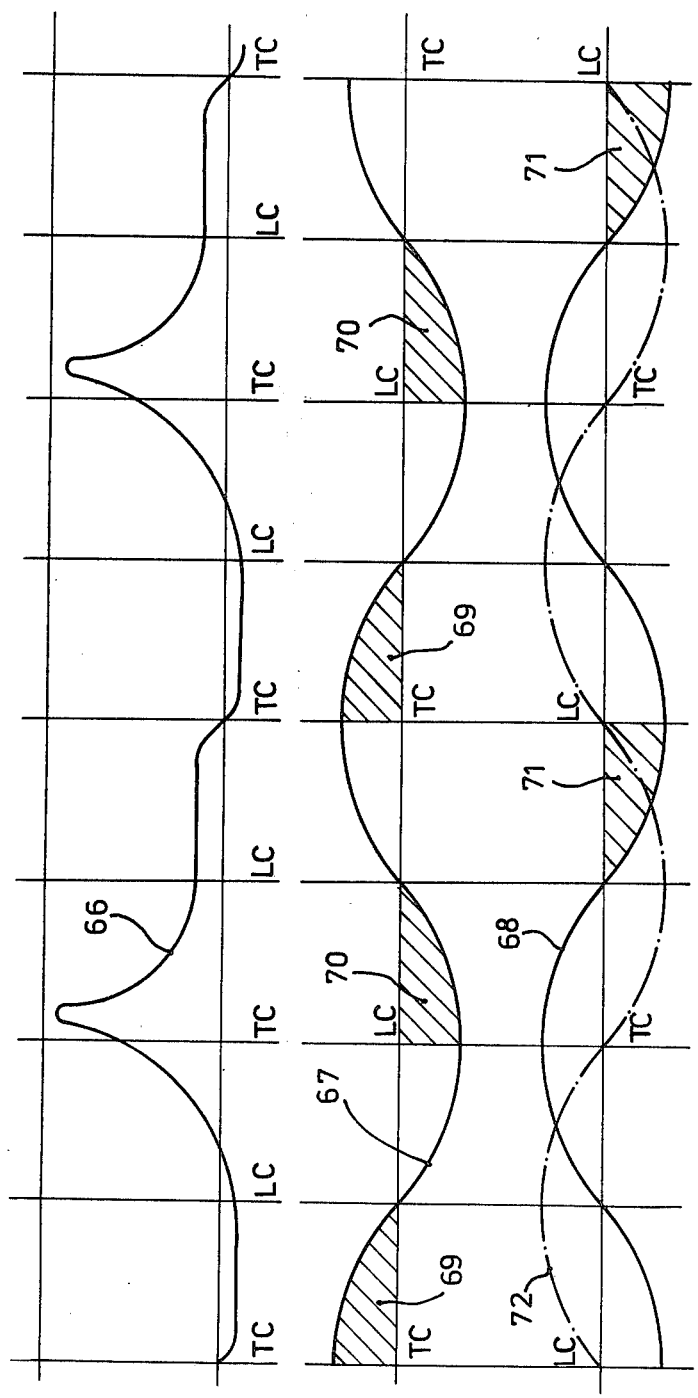

The diagrams appearing in FIGS. 5 and 6 are to illustrate the course of the strokes of the auxiliary piston relative to the main piston which can be achieved for various loads. FIG. 5 illustrates the conditions for cam control of the auxiliary piston through the drive shaft, as represented in FIG. 1, whereas FIG. 6 is based on crank control of the auxiliary piston. 60 in FIGS. 5 and 66 in FIG. 6 indicate, respectively, the shape of the pressure in the joint working space of the main and auxiliary pistons, plotted over the path of the main piston. TC and LC indicate, respectively, the top dead center and the lower dead center of the main piston. The curve line 61 represents the stroke of the auxiliary piston in the full load operation state of the internal combusion engine and the curve line 62 the shape of the stroke of the auxiliary piston for a designed partial load of approximately 25% of the rated output. The top and lower dead centers of the auxiliary piston are entered on the time axis, said auxiliary piston, as set forth above, to oscillate at half the frequency of the main piston. Thereby, the transmission ratio is determined by the toothed belt drive. Referring to curve lines 61 and 62 of FIG. 5, it is apparent that they are displaced relative to each other by 180° angle of rotation of the drive shaft, whereby the auxiliary piston at full load of the internal combustion engine attains its lower dead center precisely when the main piston assumes its compression top dead center. At 25% partial load, the phase position of the auxiliary piston, however, has been shifted sufficiently so that it, too, attains upper dead center when the main piston attains compression top dead center. The curve line 65 in dots and dashes indicates the shape of the stroke of the auxiliary piston at a medium partial load whereby the auxiliary piston lags behind the main piston relative to the compression upper dead center by a 90° angle of rotation of the drive shaft.

Below the curve line 61, a field 63 is indicated by hatching and it shows an additional suction effect of the auxiliary piston during the suction stroke of the main piston. Actually, at full load of the internal combustion engine, the auxiliary piston sucks in approximately 50% of its capacity additionally, and in this manner increases the efficiency of the internal combustion engine. On the other hand, the field 64 during the stroke of the auxiliary piston at 25% designed load illustrates the increase in the compression chamber volume during the exhaust stroke of the main piston. Due to the fact that during the exhaust stroke of the main piston the auxiliary piston will be retracting, part of the exhaust gas volume present in the entire compression chamber will be sucked into the auxiliary piston chamber and retained there. This corresponds to an internal exhaust gas return at part load whereby, as is known, the ejection of noxious exhaust gas components, especially the ejection of nitrous oxides, can be reduced.

FIG. 6 illustrates shapes of strokes corresponding to those in FIG. 5. The curve line 67 illustrates the stroke of the auxiliary piston at full load, the curve line 68 the stroke at 25% part load, and the broken line 72 represents the stroke of the auxiliary piston at an average partial load between the 25% rated load and full load. The stroke of the auxiliary piston differs from that in FIG. 5 in that in this case, the auxiliary piston is driven by the drive shaft by way of a crank drive so that sinoidal curve lines are obtained. The field 69 below the curve line 67 again indicates the interval at which the auxiliary piston sucks in additionally fresh mixture during the suction stroke of the main piston, namely, at approximately 50% of its capacity. The field 70 indicates an interval in which during the drive stroke of the main piston the auxiliary piston carries out a compression, i.e., performs negative work. This unfavorable effect could be avoided in the diagrams in FIG. 5 by a suitable design of the cam control. The field 71 of the curve line 68 again indicates the interval in which, operating under part load, the auxiliary piston sucks in a given quantity of exhause gas and retains it so that an internal exhaust gas return occurs.

Thus, the control device in accordance with the invention for control of the phase position of the auxiliary piston relative to the main piston offers the possibility of maintaining for any and all load states of the mixture-intake, spark-ignition internal combustion engine an approximately constant effective compression ratio and thereby a high thermal efficiency of the engine.

It will be understood that internal combustion engines according to this invention, the preferred embodiment of which has been described in conjunction with the Figures, are susceptible of various modifications as will occur to those skilled in the art. It is, therefore, intended that the scope of the present invention is not limited except as defined by the following claims.

What is claimed is:

1. A mixture compressing, spark-ignited internal combustion engine comprising a main piston arranged to move within a main cylinder; a crankshaft driven by the main piston; an auxiliary piston arranged to move within an auxiliary cylinder, the auxiliary compression chamber defined by the auxiliary piston and auxiliary cylinder being connected with the main compression chamber defined by the main piston and main cylinder; a drive shaft including means for driving said auxiliary piston; a drive means coupled between the crankshaft and the drive shaft for rotating the drive shaft with half the speed of the crankshaft; and a control device, responsive to operating parameters of the internal combustion engine, for varying the phase position of the auxiliary piston relative to the main piston thereby to vary the combined volume of the main and auxiliary compression chambers at compression top dead center of the main piston in accordance with said operating parameters, wherein said control device includes a controllable hydraulic coupling arranged between the crankshaft and the drive shaft.

2. A mixture compressing, spark-ignited internal combustion engine as in claim 1, wherein the hydraulic coupling includes a hydraulic vane-type adjusting servomotor, comprising a drive hub having an eccentric cylindrical aperture therethrough, a rotor connected with the drive shaft and smaller in diameter than said aperture and disposed within said aperture thereby forming a sickle-shaped working space, and a radially movable, vane-like slide on the rotor which subdivides the sickle-shaped working space into two chambers, and controlled means for providing hydraulic fluid to each of said chambers, and wherein said drive means comprises a toothed belt coupled between the drive hub and the crankshaft for driving said hub and rotor.

3. A mixture compressing, spark-ignited internal combustion engine as in claim 2, wherein the rotor is rotatable by approximately 180° relative to the drive hub.

4. A mixture compressing, spark-ignited internal combustion engine as in claim 2, wherein said controlled means comprise hydraulic fluid lines connected to each of said chambers, means for supplying hydraulic fluid under pressure to said fluid lines, controllable valves, responsive to supplied control signals, in each of the hydraulic fluid lines and a hydraulic fluid outlet.

5. A mixture compressing, spark-ignited internal combustion engine as in claim 4, wherein there is provided means for controlling said valves, including means for generating a signal representative of the compression pressure in the compression chamber of the main piston, and means, responsive to said compression pressure representative signal, for generating said valve control signals.

6. A mixture compressing, spark-ignited internal combustion engine as in claim 5, wherein the means for generating said compression pressure representative signal includes a signal gate actuated by said spark ignition.

7. A mixture compressing, spark-ignited internal combustion engine as in claim 6, wherein the means for generating said valve control signals includes a reference value generator for providing a signal representative of a desired value for the compression pressure, and a comparator connected to said reference value generator and said signal gate, for generating said valve control signals.

8. A mixture compressing, spark-ignited internal combustion engine as in claim 7, wherein the reference value representative signal generator generates a reference value signal which varies as a function of the operating state of the internal combustion engine.

* * * * *